(12) United States Patent
Mercier et al.

(10) Patent No.: US 8,625,462 B2
(45) Date of Patent: *Jan. 7, 2014

(54) OWNERSHIP REQUESTS FOR ACCESS POINTS

(75) Inventors: Marc-Olivier Mercier, St. Laurent (CA); Yannick Koehler, Montreal (CA)

(73) Assignee: Hewlett-Packard Development Company, L.P., Houston, TX (US)

(*) Notice: Subject to any disclaimer, the term of this patent is extended or adjusted under 35 U.S.C. 154(b) by 170 days.

This patent is subject to a terminal disclaimer.

(21) Appl. No.: 13/250,500

(22) Filed: Sep. 30, 2011

(65) Prior Publication Data

US 2013/0083689 A1 Apr. 4, 2013

(51) Int. Cl.
*H04L 12/28* (2006.01)
*H04W 4/00* (2009.01)
*G06F 15/173* (2006.01)

(52) U.S. Cl.
USPC ............ 370/254; 370/230; 370/328; 709/224

(58) Field of Classification Search
USPC ........... 370/230–329; 709/224–226; 455/434, 455/435.1
See application file for complete search history.

(56) References Cited

U.S. PATENT DOCUMENTS

| 7,069,468 B1* | 6/2006 | Olson et al. ................... 714/4.2 |
| 7,606,912 B1 | 10/2009 | Masters |
| 7,917,624 B2 | 3/2011 | Gidwani |
| 7,944,886 B2 | 5/2011 | Stephenson et al. |
| 2006/0159043 A1* | 7/2006 | Delp et al. .................... 370/328 |
| 2007/0153741 A1 | 7/2007 | Blanchette et al. |
| 2007/0174559 A1* | 7/2007 | Pfingsten et al. ............. 711/154 |
| 2009/0158042 A1 | 6/2009 | Calhoun et al. |
| 2012/0259978 A1* | 10/2012 | Petersen et al. ............... 709/224 |
| 2012/0259992 A1* | 10/2012 | Koehler et al. ............... 709/229 |
| 2013/0060818 A1* | 3/2013 | Lambeth et al. .............. 707/803 |

FOREIGN PATENT DOCUMENTS

JP 2007123952 5/2007

* cited by examiner

*Primary Examiner* — Afsar M Qureshi
(74) *Attorney, Agent, or Firm* — Preetam B. Pagar

(57) ABSTRACT

Techniques for ownership of an access point are described. An ownership request may be received by a master controller. Ownership of the access point may be determined by the master controller. An ownership response may indicate if a controller shall take ownership of the access point.

13 Claims, 4 Drawing Sheets

OWNERSHIP REQUESTS FOR ACCESS POINTS

BACKGROUND

Computer networks allow computing devices, such as client computers, servers, and mobile devices, to communicate with each other. Wireless networks, such as Wi-Fi networks, allow for such communication without the need for a wired connection between the computing device and the network. A computing device may connect to a wireless access point using Radio Frequency (RF) communications. The wireless access point may then provide the computing device with connectivity to the network.

DETAILED DESCRIPTION

Figure 1:
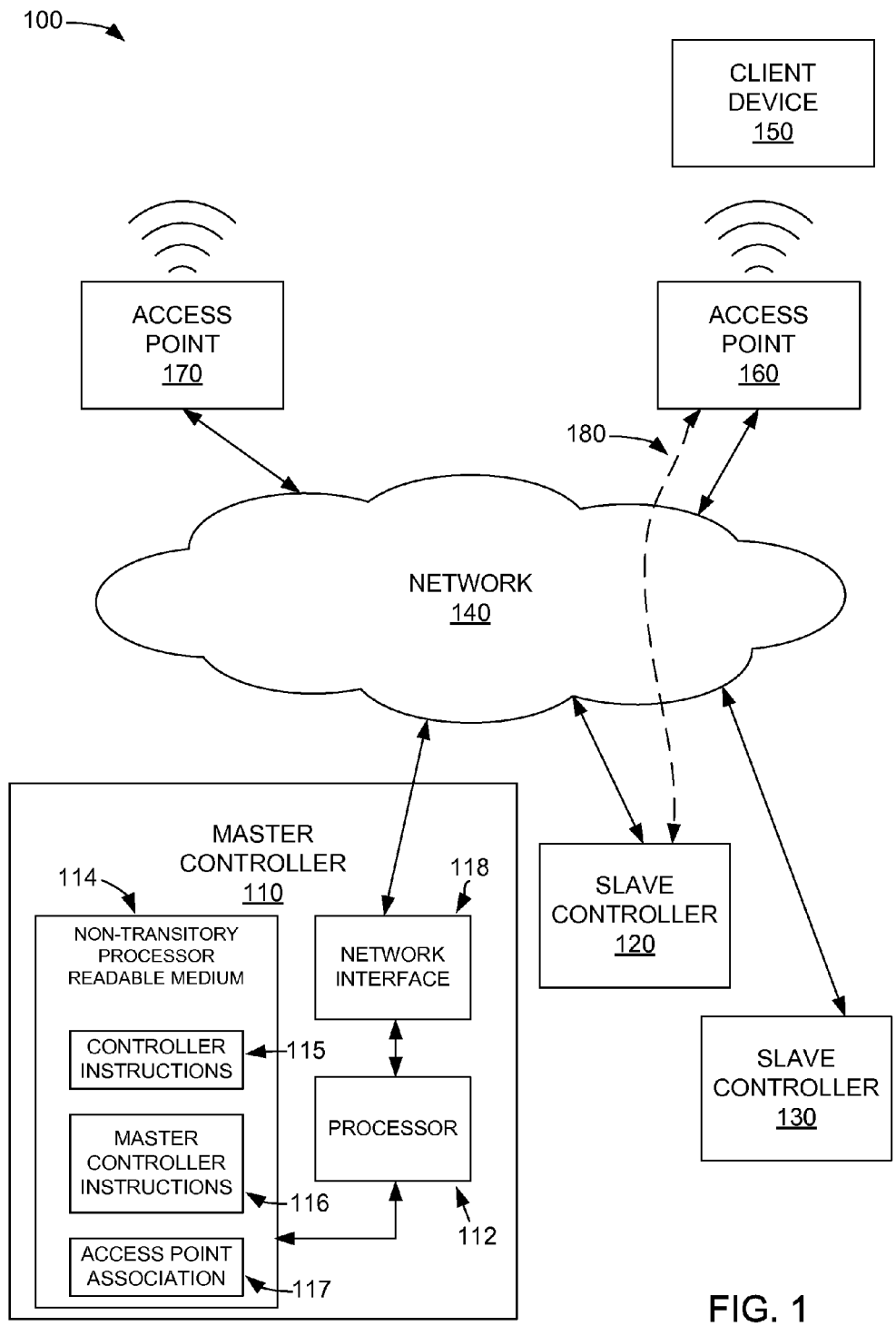
FIG. 1 is an example of a system which may implement techniques described herein.

Computer networks include various network elements, such as routers and switches. These types of elements are typically connected to each other through the use of physical cables. A client device may also use physical cables to connect to the network. In order to add wireless capabilities to a network, a wireless access point may be added. A wireless access point typically refers to a device that contains RF components, such as radios, that permit wireless clients to connect to the access point. It is through the wireless access point, which may simply be referred to as an access point, that the client devices gain wireless access to the network.

An access point may be configured with several parameters in order to operate. For example, the access point may be configured with a radio channel or frequency in which to operate, an RF power level, and various authentication and security parameters. In simple network topologies, an access point may be configured directly by an administrator. However, as the network topology complexity increases and additional access points are required, direct administrator configuration of all access points becomes increasingly complex. Furthermore, configuration of each access point may depend on the operational status of all other access points on the network. For example, if an access point is taken out of service, the remaining access points may need to be reconfigured to compensate for the inoperative access point.

In order to eliminate the need for direct configuration of an access point, a network controller, or simply a controller, may be employed. The access point may connect to a controller and the operational parameters may be sent to the access point from the controller. The controller may be aware of the operational status of all connected access points and may configure the access points based on this status. More than one network controller may be present in some network architectures. For example, based on the number of access points that will connect to the network, individual controller capacity may determine that more than one controller is needed. As another example, for geographically diverse networks, separate controllers may be used for each geographic region.

A problem may arise in network topologies that contain more than one controller. When an access point is first connected to the network, the access point may need to connect to a controller to receive operational parameters. However, the presence of multiple controllers may complicate the process as the access point may be faced with multiple candidate controllers from which to select. Further exacerbating the problem is the fact that each controller may only be aware of its own operational status with respect to connected access points and may not contain a network wide view of the entire state of all access points within the network. For example, an individual controller may be overloaded with access points while other controllers are more lightly loaded. Such information may not be available given the distributed nature of the controllers.

Techniques described herein may be useful in overcoming the problems presented by multiple controllers. A network may contain multiple controllers. The group of controllers, which can be referred to as a team of controllers, may have one controller designated as the master controller. The master controller may maintain data about the entire network, including data such as which access points are connected to which controller.

An access point that is in the process of connecting to a network may broadcast a controller discovery request on the network. All controllers that are available may receive this broadcast discovery request. Every controller that receives the discovery request may send an ownership request to the master controller. The ownership request may be a request by the controller to take ownership of the access point. The master controller may receive the ownership requests from all of the available controllers. The master controller may make a determination as to which controller shall take ownership of the access point. The determination may be based on the current operational status of the network including the status of all of the controllers. The master controller may instruct one controller to take ownership of the access point and instruct the remaining controllers to ignore the discovery request. The selected controller may then send a join request to the access point to inform the access point that it shall connect to the selected controller. The selected controller may then send any operational parameters that are needed for operation to the access point.

FIG. 1 is an example of a system which may implement techniques described herein. The system 100 may include controllers 110,120, 130. Of these controllers, one controller 110, may be designated the master controller. The remaining controllers may be designated as slave controllers. The master controller may be used to select to which controller an access point will connect, as will be described in further detail below. Although only master controller 110 is shown in detail, controllers 120,130 may have a similar structure to the master controller. In some example implementations, the master controller and the slave controllers may have identical structure and may be distinguished by the functionality that is enabled. For example, the master controller functionality may lie dormant on slave controllers. However, the master controller functionality may be present on the slave controllers and may be enabled if it is determined that a slave controller should become the master. For example, if a master controller is taken out of service, a slave controller may be promoted to master.

The master controller may include a processor 112. The processor may be used to execute instructions that cause the controller to implement the techniques described herein. For example, coupled to the processor may be a non-transitory processor readable medium 114 that contains instructions, which if executed by the processor, cause the controller to implement the techniques described herein. The medium may include controller instructions 115 that cause the processor to provide functionality of a non-master controller. For example, the controller instructions may be used to take ownership of an access point, once instructed by the master controller, and send any operational parameters that are needed by the access point to the access point.

The medium 114 may also include master controller instructions 116. The master controller instructions may include instructions which if executed by the processor cause the processor to provide the functionality of a master controller. For example, the master controller instructions may be used to receive ownership requests for an access point from the team of controllers and determine which controller shall take ownership of the access point.

The medium may also include access point association 117 data. Access point association data may include a listing of which access points are currently owned, which may also be referred to as associated with, each controller. In some example implementations, the access point associations may be maintained in a table, with each entry in the table specifying an access point and to which controller that access point is associated. Furthermore, the table may contain information which may be used to determine if a controller that was active, in other words operational, is still active. Use of the access point association data will be described in further detail below.

The processor 112 may also be coupled to a network interface 118. The network interface may be used by the master controller to communicate with the various elements shown in FIG. 1. The master controller may use network interface to communicate with network 140, which will be described in further detail below.

System 100 may also include slave controllers 120,130. As mentioned above, slave controllers may have the same general structure as the master controller. However, certain instructions may be dormant on the slave controller unless the slave controller is promoted to master. For example, the master controller instructions may be present in the slave controller, but the instructions are not executed by the processor of the slave controller.

The master controller 110 and the slave controllers 120, 130 may exchange data, such as the data that is contained in the access point association 117 data. In some example implementations, the master controller may update the access point association data on the slave controllers when there is a change in the association information. By doing so, the slave controllers may maintain knowledge of the current association of access points to controllers. Thus, if a master controller is taken out of service and a slave controller is promoted to master, the promoted slave may already contain the association data and need not rebuild the associations.

Furthermore, the master controller and the slave controllers may exchange data to inform each other of their own operational status. In one example implementation, the slave controllers may maintain communications with the master controller to inform the master controller that the slave controller is active and operational. Lack of such communication may indicate that the slave controller is not active and is thus not available to take ownership of an access point. Furthermore, such communications may be used by the team of controllers to identify which controller is currently designated the master controller.

System 100 may also include network 140. The network may allow the elements depicted in FIG. 1 to communicate with each other. The network may be any type of network that enables communication between the various network elements depicted in FIG. 1. The network may be a public or private network. The network may be a local or wide area network (LAN or WAN). The network may be an intranet or the public Internet. It should be understood that any network capable of enabling communications between the elements described in FIG. 1 would be suitable and the techniques described herein are not dependent on the particular type of network that is used.

The system 100 may include any number of wireless client devices. Client devices may include devices such as computers, mobile phones, personal digital assistants, or any other device that is able to wirelessly connect to a network via an access point. FIG. 1 depicts a single client device 150, however it should be understood that there may be any number of client devices. As shown, client device 150 may be in wireless communication with access point 160. Client device 150 may gain access to network 140 through the access point 160.

System 100 may also include one or more access points 160,170. The access points may include any necessary hardware to enable wireless communications with client devices. For example, the access points may include radio hardware to enable wireless communications. The access point may also include security and authentication to ensure that only authorized clients are able to connect to the access point. The access points 160,170 may receive their operational parameters from one of controllers 110,120,130. As shown in FIG. 1, access point 160 may be associated 180 with slave controller 120. In other words, slave controller 120 may be responsible for sending the operational parameters needed for operation of access point 160 to the access point.

Access point 170 may be an access point that has just attached itself to the network 140. As such, access point 170 may not yet be configured. In order to become operational, access point 170 may need to receive operational parameters from one of controllers 110,120,130. Prior to receiving the operational parameters, it may need to be determined to which controller access point 170 should associate. The process of determining the proper controller to which to associate will be described in further detail below.

Figure 2:
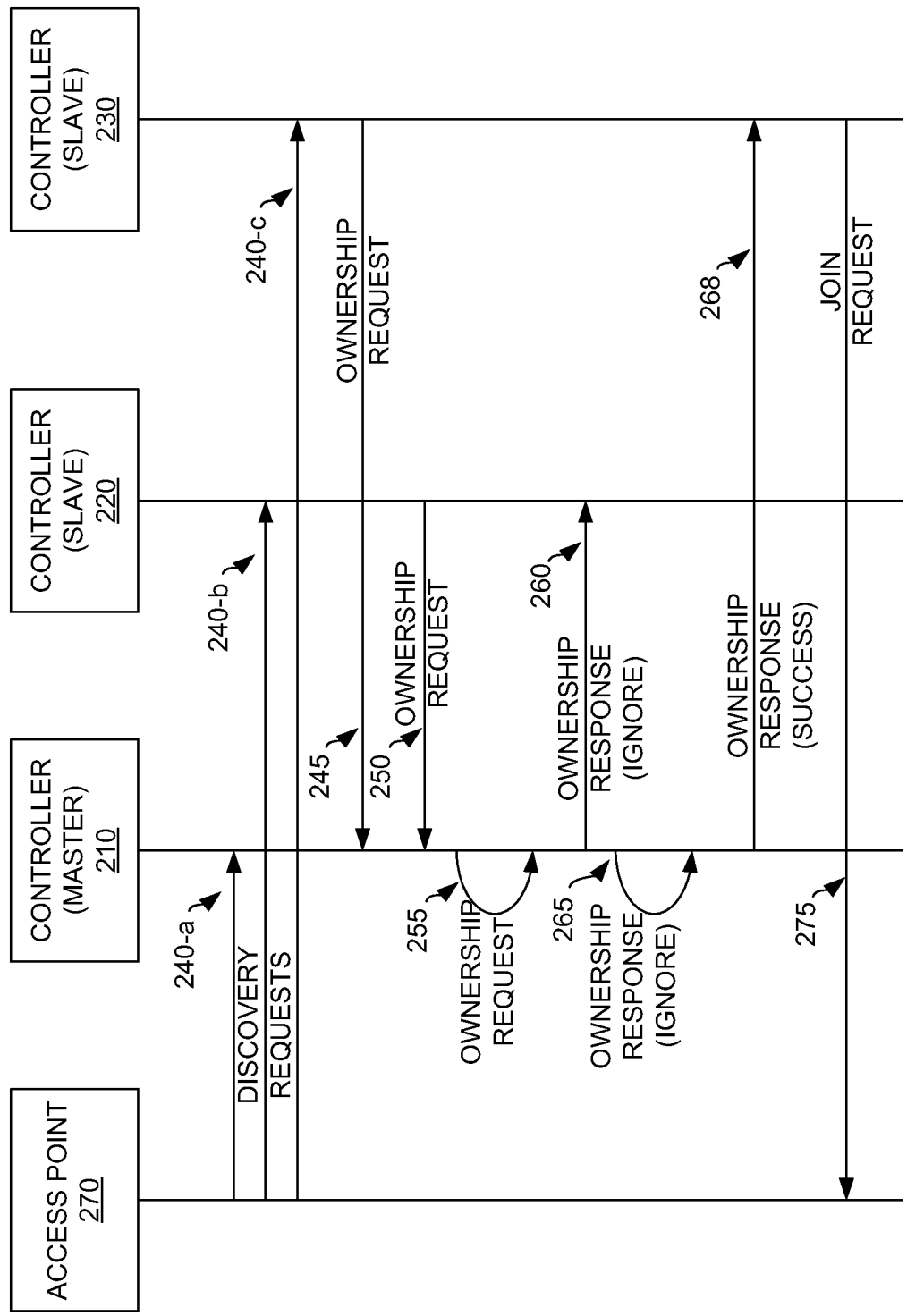
FIG. 2 is an example of a message exchange sequence.

FIG. 2 is an example of a message exchange sequence. In some example implementations the message sequence described in FIG. 2 may describe the message flows for an access point that has just attached to the network and needs to be configured with operational parameters. As described above, in some example implementations, it must first be determined with which controller the access point will associate. Once the access point has associated with the determined controller, the process of configuration of the access point by the controller may begin.

Access point 270 may represent an access point that has just attached to a network, but has not yet been configured. For example, access point 270 may represent access point 170 that was described with respect to FIG. 1. Upon connection to the network, access point 270 may broadcast a discovery request 240 (a-c). In some example implementations the access point may send a single discovery request message on the network that is addressed to all controllers. In other example implementations, the access point may send an individual discovery request message to each controller. Regardless of the implementation, the discovery request may be received by each of controllers 210,220,230.

Upon receipt of the discovery request, each controller may send an ownership request to the master controller to determine if the sending controller should take ownership of the access point. As shown, controller 230 may send an ownership request 245 to the master controller 210. Likewise, controller 220 may also send an ownership request 250 to the master controller. Master controller 210 may also send an ownership request 255 to the master controller. As shown, the master controller may send the ownership request to itself. By doing so, the master controller may be able to segregate functionality that is provided by the master controller from functionality that is provided by all controllers. For example, the master controller may simply respond to a discovery request by executing the same instructions that a slave controller would execute. Thus, any controller that receives a discovery request sends an ownership request to the master controller, even if the controller that received the request and the master controller are the same device.

It should be understood that at this point in the message sequence, the controllers have not allocated any resources, such as memory, for use by the access point, because it is not yet known to which controller the access point will associate. As such, the controllers need not reserve any resources at this point in time. It is not until ownership of the access point has been determined that resources will be allocated by the controller that is selected to own the access point.

The master controller 210 may receive the ownership requests from each of the controllers 210,220,230. The master controller may make a decision as to which controller shall take ownership of the access point 270. In one example implementation, the master controller may simply grant ownership to the first controller that sends an ownership request. In a different example implementation, the master controller may first examine the access point association 117 data to determine the loading of each controller. Because the master controller is aware of the loading of each controller, the master controller is able to determine to which controller the access point should be associated based on some assignment policy. For example, an assignment policy may indicate that the controller with the least number of associated access points should be granted ownership of a new access point. Thus, the master controller may be able to determine to which controller the access point will be associated, because the master controller has a system wide view of the current access point to controller associations.

In some example implementations, the master controller may determine the proper controller to grant ownership based on if the access point was previously owned by a controller and if that controller is still active. For example, an access point may have been owned by controller 220. The access point may have been taken out of service for some reason. For example, the access point may have rebooted due to an error. When the access point attempts to reconnect to the network, the access point association data may show that the access point was previously owned by controller 220. If controller 220 is currently active, the master controller may determine that ownership of the access point shall remain with controller 220. However, if the controller 220 is no longer active, for example, the controller 220 may be out of service for some reason, the master controller is aware of this through the inter-controller communication described above. Thus, the master controller would not attempt to grant ownership to controller 220 even though that controller previously owned the access point.

Once the master controller has made a decision as to which controller may take ownership of the access point, the master controller may send an ownership response 260,265,268 to the controllers 210,220,230. The ownership response may include an indication to ignore the discovery request from the access point, which means that the controller receiving the ownership response indicating ignore will not take ownership of the access point. As shown, ownership responses 260,265 sent to controllers 210,220 inform the controllers that they will not take ownership of the access point 270. As such, controllers 210,220 will take no further action with respect to the access point 270. As no resources were previously allocated by controllers 210,220 with respect to access point 270, there are no resources that need to be released.

The master controller 210 may send an ownership response indicating success to one of the controllers 210,220,230. As shown in FIG. 2, ownership response 268 sent from the master controller to controller 230 indicates a successful response. In addition, the master controller may update the access point association 117 data to indicate that the selected controller is to take ownership of the access point. The controller 230 may receive the successful ownership response and take ownership of the access point 270. For example, the controller 230 may send a join request 275 to access point 270 which informs the access point that it may be associated with controller 230. It should be understood that the access point may receive a join request from a single controller. As such, the access point need not make any determination as to which controller to join, as there is only one controller that has invited the access point to join. The controller 230 and access point 270 may then exchange the necessary operational parameters for the access point to successful connect to the network and be properly configured. The specific protocol used to configure the access point once ownership by a controller has been determined is generally not important. However what should be understood is that the problem of determining which controller shall take ownership of an access point is solved through the use of the master controller, as has been described above.

In some cases, the master controller may determine that no controller shall take ownership of the access point. For example, if all controllers are at their maximum capacity, it may not be possible for any controller to take ownership of the access point. As explained above, the master controller, through the use of the access point association 117 data, is aware of how many access points are currently associated with each controller. If the access point is not to be associated with any controller due to insufficient capacity on all of the controllers, the master controller may send a capacity exceeded ownership response (not shown). Each controller that receives a capacity exceeded ownership response may not take ownership of the controller. In addition, the controller may report the capacity exceeded response to a system administrator, such that the administrator may determine if corrective action, such as adding additional controllers, is needed. Furthermore, the controller may implement a throttling procedure to ensure that an access point that cannot be owned does not cause an excessive number of ownership requests to be sent to the master controller from the team of controllers. The throttling process will be described in further detail with respect to FIG. 3.

Figure 3:
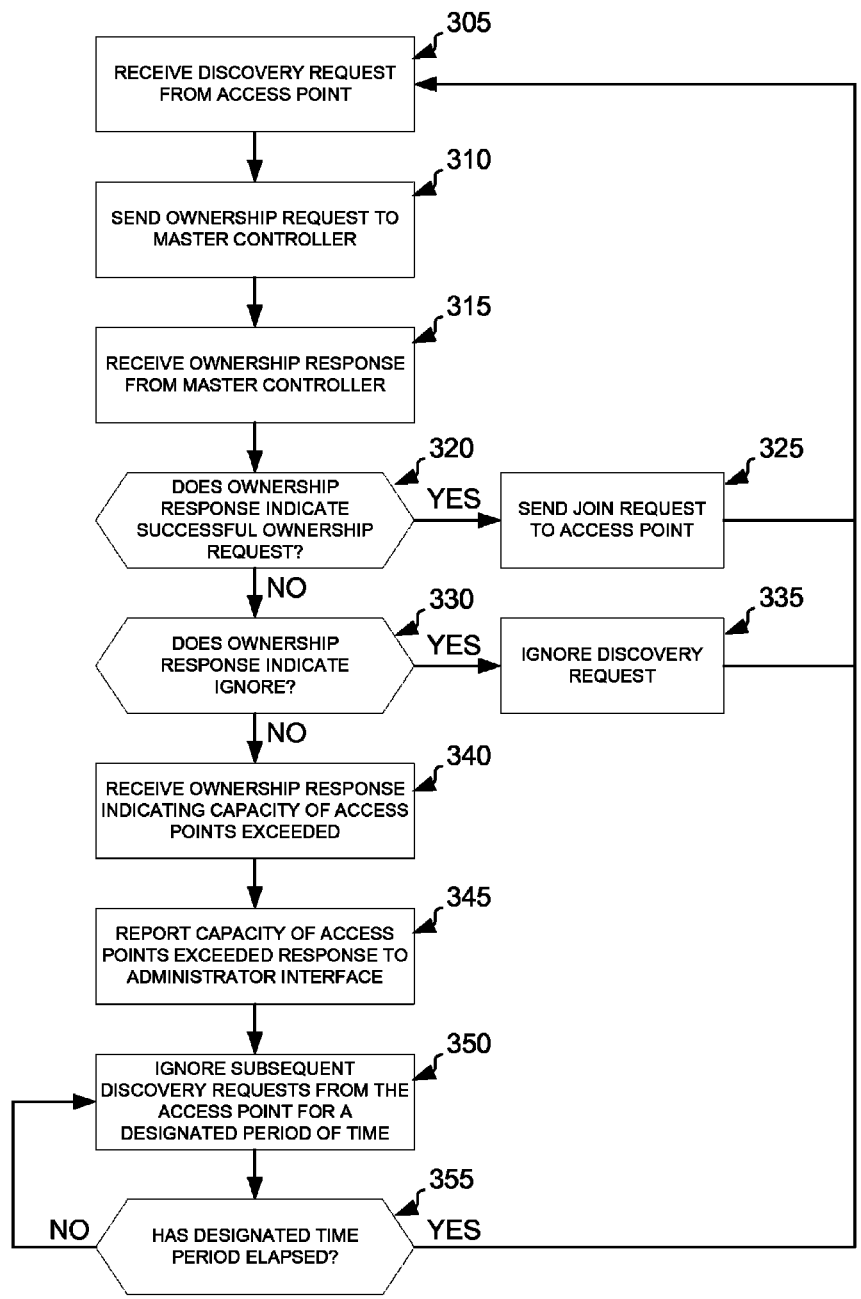
FIG. 3 is an example of a high level flow diagram for requesting ownership.

FIG. 3 is an example of a high level flow diagram for requesting ownership. In block 305 a discovery request may be received by a controller from an access point. In block 310 the controller may send an ownership request to the master controller. As mentioned previously, the master controller may be a different controller or it may be the controller that received the discovery request in block 305. What should be understood is that the ownership request may be sent to whichever controller has been designated as the master controller. In block 315, an ownership response may be received from the master controller.

In block 320, the ownership response may be examined to determine if the ownership response indicates a successful ownership request. If not, the process moves to block 330, which is described below. If the ownership response does indicate a successful request, the process may moves to block 325. In block 325, the controller may send a join request to the access point. The join request informs the access point that the controller sending the join request will be taking ownership of the access point. The access point and the controller may then exchange operational parameters using any suitable protocol.

In block 330 the ownership response may be examined to determine if the ownership response indicates that the discovery request should be ignored. If not, the process moves to block 340, which is described below. If the ownership response does indicate that the discovery request should be ignored, the process moves to block 335. In block 335 the discovery request is ignored. The controller may take no further action and no further communication with the access point may be needed.

In block 340, an ownership response indicating the capacity of access points has been exceeded. The reason for this is that for a new access point, there may be three possibilities. The access point may be owned by the controller, the access point may be owned by a different controller, so the current controller may ignore the discovery request, or that there is insufficient capacity on the entire team of controllers. As the previous two cases are addressed in blocks 320 and 330, block 340 handles the case where the access point may not be owned by any controller in the team of controllers, as there is insufficient capacity.

In block 345, the controller may report the capacity of access points exceeded response to an administrator interface. The report may be used by an administrator to indicate that insufficient controller resources were available at the time the access point attempted to connect to the network. The administrator may take corrective action, such as adding additional controllers, as needed.

In block 350, subsequent discovery requests from the access point may be ignored for a designated period of time. As mentioned above, when ownership of an access point is denied because of insufficient capacity, it may become necessary to throttle the number of ownership request sent to the master controller. In normal operation, if an access point does not receive a join request from any controller, it may broadcast additional discovery requests. These requests will in turn trigger additional ownership requests to be sent from each controller to the master controller. This process may continue until the access point receives a join request from a controller.

If an ownership request for an access point is denied because of insufficient capacity, the capacity issue may not be resolved in the timeframe between subsequent discovery requests from the access point. Thus, the additional discovery request may result in unnecessary ownership requests, as ownership of the access point may not be granted until the capacity issue is resolved. As such, in block 350, subsequent discovery requests from an access point may be ignored for a designated period of time. The designated period of time may be configured by an administrator of the system or may be predefined. In block 355 it is determined if the designated period of time has elapsed. If not, the process returns to block 350, wherein a subsequent discovery request from the access point may continue to be ignored. Once the designated period of time has elapsed, the process returns to block 305, wherein the discovery request may be handled as was described above.

Figure 4:
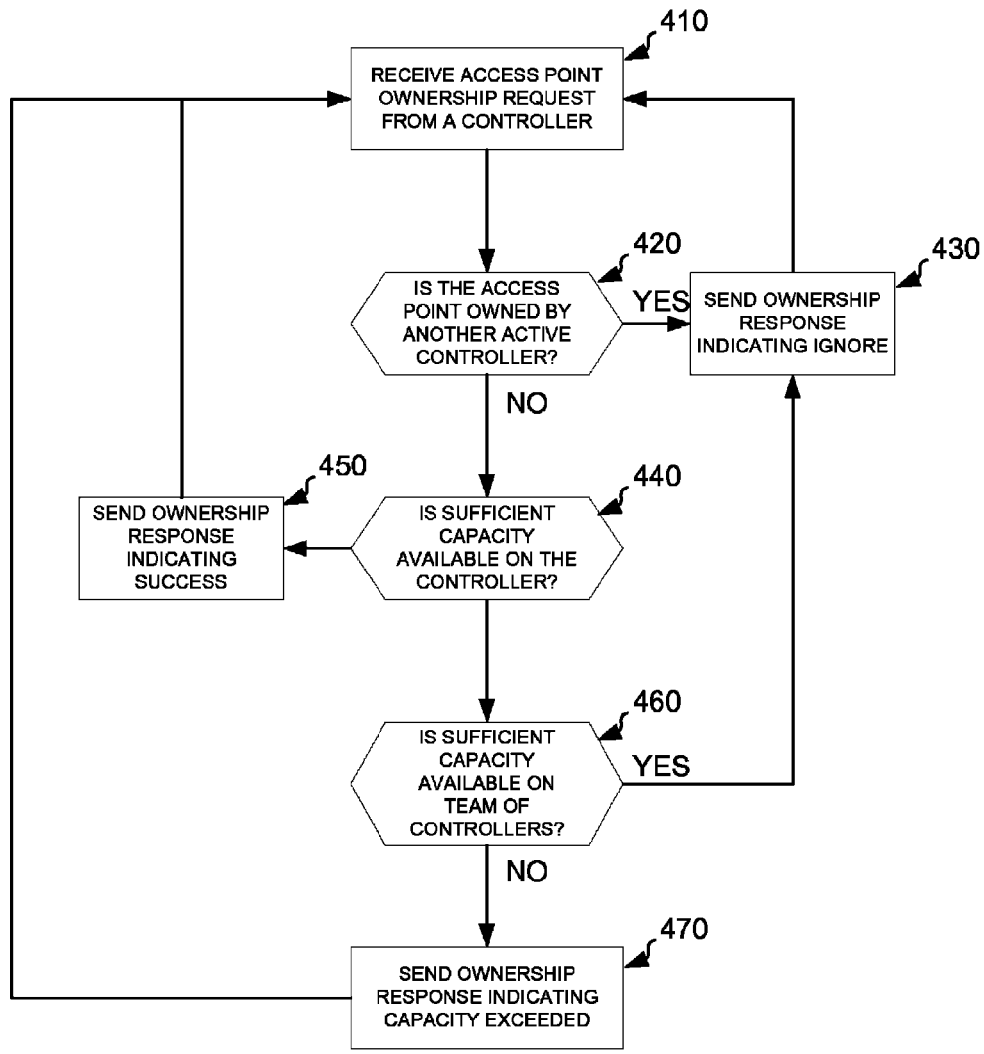
FIG. 4 is an example of a high level flow diagram for determining ownership.

FIG. 4 is an example of a high level flow diagram for determining ownership. In block 410 an access point ownership request may be received from a controller. For example, the controller may be the master controller. In block 420 it may be determined if the access point is owned by another active controller. In other words, it may be determined if the access point association 117 data indicates that the access point is owned by another controller and that controller is currently operational. This situation can occur, for example, if an access point disconnects from the network because of a reboot caused by an error. The access point may then attempt to reconnect to the network. As the access point had previously been owned by a controller, it may increase efficiency if ownership is again granted to the same controller, assuming that controller is still active.

If it is determined that the access point is owned by another active controller, the process moves to block 430, wherein a ownership response indicating ignore may be sent to the controller. The reason for this is that ownership would preferably be granted to the controller that previously owned the access point. An ownership request from that controller should be granted, and as such, the ownership request received in block 410 should be ignored.

In block 440 it may be determined if there is sufficient capacity available on the controller to take ownership of the access point. As mentioned above, the master controller, through the access point association data is aware of the current load of all controllers within the system and is thus able to make a determination as to which controller should take ownership. Sufficient capacity on a controller may include the ability of the controller itself to take ownership of the access point. Furthermore, sufficient capacity may also include the ability of the controller to take ownership of the access point, relative to other controllers. For example, even if a controller has sufficient capacity to take ownership of the access point, there may be another controller that is more lightly loaded. It may be preferable to assign the access point to the more lightly loaded controller.

If it is determined that sufficient capacity is available on the controller, the process moves to block 450, wherein an ownership response indicating success may be sent to the controller. If sufficient capacity is not available on the controller, the process may move to block 460. In block 460, it may be determined if sufficient capacity is available on any controller within the team of controllers. If sufficient capacity is not available on any controller, the process moves to block 470, wherein an ownership response indicating capacity exceeded may be sent. The reason for this is that there is no controller that has sufficient capacity to take ownership of the access point. The controller receiving the capacity exceeded response may then implement the throttling procedure described above.

If sufficient capacity is available on the team of controllers, the process moves to block 430, wherein an ownership response indicating ignore may be sent to the controller. The reason that an ignore ownership response is sent is because there is insufficient capacity available on the controller that sent the ownership request, as was determined in block 440. However, there is sufficient capacity available on the entire team of controllers. A capacity exceeded response may not be appropriate because although the controller that sent the ownership request in block 410 may not have sufficient capacity, at least one other controller in the team does have sufficient capacity. The remaining controllers may also send ownership requests. At least one of those request may come from a controller that has sufficient capacity. As such, the ownership request from the controller with sufficient capacity should be granted once received.

We claim:
1. A method comprising:
receiving, at a controller, a discovery request from a wireless access point;
sending an ownership request to a master controller in response the discovery request;

receiving an ownership response from the master controller in response to the ownership request at the controller; and ignoring the discovery request from the wireless access point if the ownership response from the master controller indicates ignore.

2. The method of claim 1 further comprising:

sending a join request from the controller to the wireless access point if the ownership response indicates the ownership request is successful.

3. The method of claim 1 further comprising:

ignoring subsequent discovery requests from the wireless access point for a designated period of time if the ownership response from the master controller indicates a capacity of wireless access points exceeded.

4. The method of claim 3 further comprising:

reporting the capacity of wireless access points exceeded ownership response to an administrator interface.

5. The method of claim 1 wherein the master controller and the controller are the same device.

6. A non-transitory computer readable medium containing thereon a set of instructions which if executed by a processor of a master controller cause the master controller to:

receive a wireless access point ownership request from a controller;

determine if the controller will own the wireless access point;

send an ownership response indicating if the controller will own the wireless access point based on the determination;

determine if sufficient capacity is available on the controller;

determine if the wireless access point is owned by another active controller; and send the ownership response indicating ignore if there is sufficient capacity on the controller and the wireless access point is owner by another active controller.

7. The non-transitory computer readable medium of claim 6 further including instructions which cause the master controller to:

send the ownership response indicating success if there is sufficient capacity on the controller and the wireless access point is not owned by another controller.

8. The non-transitory computer readable medium of claim 6 further including instructions which cause the master controller to:

determine if sufficient capacity is available on the controller;

determine if sufficient capacity is available on a team of controllers including the controller; and send the ownership response indicating ignore if it is determined that sufficient capacity is not available on the controller and there is sufficient capacity on the team of controllers.

9. The non-transitory computer readable medium of claim 8 further including instructions which cause the master controller to:

send the ownership response indicating capacity exceeded if it is determined that sufficient capacity is not available on the team of controllers.

10. A device comprising:

a network interface to receive a wireless access point ownership request from a controller;

a processor to;

determine if the controller will take ownership of the wireless access point, wherein the processor generates an ownership response indicating the results of the determination, wherein the ownership response is sent to the controller over the network interface;

determine if sufficient capacity is available on the controller;

determine if the wireless access point is owned by another active controller; and send the ownership response indicating ignore if there is sufficient capacity on the controller and the wireless access point is owned by another active controller.

11. The device of claim 10 further comprising:

a non-transitory processor readable storage to maintain an association of wireless access points to controllers.

12. The device of claim 11 wherein the ownership determination is based on the association of wireless access points to controllers.

13. The device of claim 12 wherein the ownership determination is based on a current load on the controller.

* * * * *

UNITED STATES PATENT AND TRADEMARK OFFICE
CERTIFICATE OF CORRECTION

PATENT NO. : 8,625,462 B2
APPLICATION NO. : 13/250500
DATED : January 7, 2014
INVENTOR(S) : Marc-Olivier Mercier et al.

It is certified that error appears in the above-identified patent and that said Letters Patent is hereby corrected as shown below:

In the Claims

In column 9, line 36, in Claim 6, delete "owner" and insert -- owned --, therefor.

Signed and Sealed this
Twenty-seventh Day of May, 2014

Michelle K. Lee
*Deputy Director of the United States Patent and Trademark Office*